United States Patent [19]
Hrynik et al.

[11] Patent Number: 5,741,987
[45] Date of Patent: Apr. 21, 1998

[54] ASSEMBLY ASSURANCE APPARATUS

[75] Inventors: Thomas F. Hrynik, Troy; Joseph J. Melotik, White Lake; Robert C. Pazdzierz, Utica, all of Mich.

[73] Assignee: Ford Global Technologies, Inc., Dearborn, Mich.

[21] Appl. No.: 784,892

[22] Filed: Jan. 16, 1997

[51] Int. Cl.⁶ ................................................ G01M 19/00
[52] U.S. Cl. ........................ 73/865.8; 73/865.9; 200/61.42
[58] Field of Search ............................. 73/865.8, 865.9; 200/61.44, 61.42; 81/429, 467; 29/240

[56] References Cited

U.S. PATENT DOCUMENTS

| | | |
|---|---|---|
| 3,898,119 | 8/1975 | Barr et al. |
| 3,906,819 | 9/1975 | Curtis .............................. 81/475 |
| 4,173,059 | 11/1979 | Hashimoto et al. .................. 81/469 |
| 4,470,619 | 9/1984 | Imajyo et al. |
| 4,625,597 | 12/1986 | Cast ................................. 81/429 |
| 4,649,753 | 3/1987 | Goodsmith ........................ 73/865.8 |

Primary Examiner—Hezron E. Williams
Assistant Examiner—Nashmiya Ashraf
Attorney, Agent, or Firm—Daniel M. Stock

[57] ABSTRACT

An apparatus for assuring the proper seating of a seat belt mounting bolt 30 against a mounting tab 36 is provided that includes a cage member 56 receiving a drive tool 52 to abuttingly engage the tab 36 against a vehicle body panel 14 with the cage member 56 while drivingly engaging the bolt 30. Electrical contacts 66, 68 on the drive tool 52 engage the cage member 56 to provide an electrical signal indicating the bolt 30 is seated with respect to the tab 36.

13 Claims, 1 Drawing Sheet

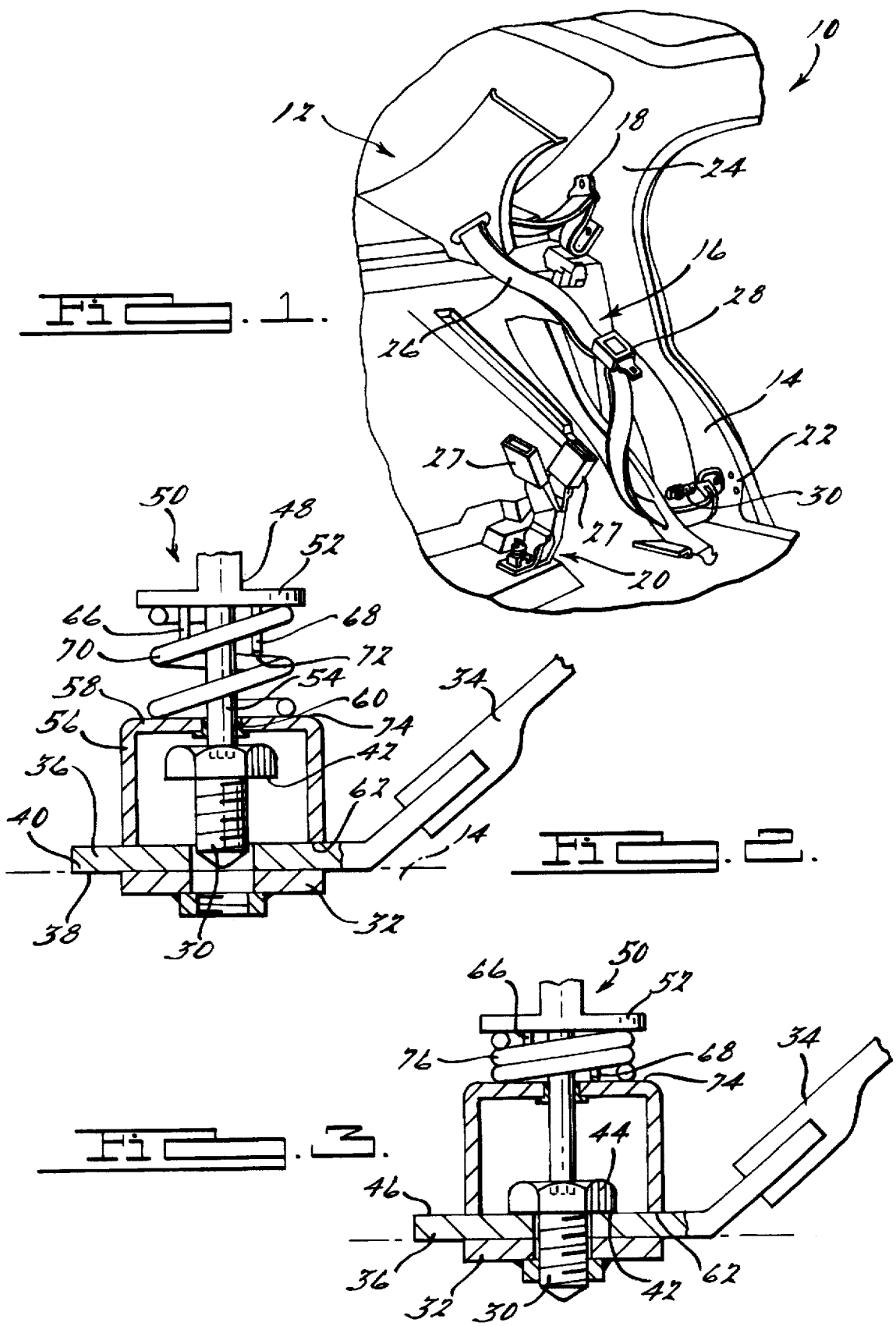

ASSEMBLY ASSURANCE APPARATUS

BACKGROUND OF THE INVENTION

1. Technical Field

The present invention relates generally to fastener inspection tools and more specifically to conformation tools for verifying full fastener engagement in automotive vehicle assemblies in which threaded fasteners are used to secure seat belt components to automotive bodies.

2. Description of Related Art

It is important in the assembly of automotive vehicles to securely install that componentry which makes up the automobile seat belt system. Such componentry including seat belt retractors, buckles, guide rings and the like typically include mounting tabs which are laid in abutting relationship against a portion of the vehicle body and are clampingly secured against the body by threaded engagement of a bolt into a nut mounted on the body. It is also important that the bolt or other fastener be fully engaged against the mounting tab to effect secure engagement of the associated seat belt component. To assure that this assembly is properly effective, it is a common practice in automotive assembly plants to monitor the torque with which the screw is driven into the nut as an indication of proper seating of the bolt against the nut. Variations occur in the assembly of the bolt with respect to the nut as well as in tolerance spread from fabrication and material variances and the like. In some situations these can lead to difficulties in reliably monitoring the torque readings. Inaccurate torque readings can result in the failure to recognize that a bolt has not fully seated against the seat belt component.

SUMMARY OF THE INVENTION

Responsive to the disadvantages of the prior art, it has been determined that the appropriate indicator of secure engagement for such an assembly is the assurance of full seating of the bolt with respect to the mounting tab of the seat belt components which is being mounted to the automotive vehicle body. This is accomplished through providing an assembly assurance apparatus that includes a rotatably driven drive tool, a cup-like cage member having a base portion slidably receiving the drive tool, and retainer portion for abuttingly engaging the seat belt component mounting tab and which includes a pair of spaced electrical contacts carried for movement with the drive tool to engage the base portion of the cage member only when the bolt is fully seated with respect to the seat belt component mounting tab.

According to one aspect of the present invention, a helical compression spring is interposed between the drive tool and the cage member and the electrical contact carried internally of the helical compression spring.

BRIEF DESCRIPTION OF THE DRAWINGS

Other aspects features and advantages of the present invention may be appreciated by reference to the following drawing, in which:

FIG. 1 is an internal perspective view of an automotive vehicle illustrating the insulation of the automotive seat belt component with respect to vehicle body;

FIG. 2 is a diagrammatic cross-sectional view of the apparatus according to the present invention; and FIG. 3 is a diagrammatic cross-sectional view of the apparatus in the fully seated position.

DESCRIPTION OF PREFERRED EMBODIMENTS

Turning now to the drawings, and particularly to FIG. 1 thereof, an automotive vehicle having a body 10 is illustrated in its rear seat compartment, indicated generally at 12, as including body structural panels, such as are indicated generally at 14, to which is secured an automotive seat belt assembly 16. Those skilled in the automotive restrain arts will appreciate that the seat belt system 16 is shown for illustrative purposes only. Virtually all automotive vehicles sold at the time of the filing of this application include seat belt systems of some kind, which share with the seat belt assembly 16 a plurality of anchor points with respect to the body and the seat belt assembly 16 of FIG. 1. Three such points are shown as 18, 20 and 22. The FIG. 1 embodiment is a rear seat driver side embodiment of a North American vehicle, and the anchor points 18 and 22 are shown as being fixed with respect to the rear or C-pillar, indicated generally at 24, of the vehicle. In-board of the anchor points 18, 22, which anchor upper and lower point ends respectively of the belt 26, is the buckle end 27, which latchingly receives a buckle 28 slidably received along the belt 26 in known manner.

Importantly, at each of the anchor points 18, 20, 22, a fixed connection with the adjacent body structure is effected through use of a bolt such as the bolt 30 shown with respect to the anchor point 22.

Turning now to FIGS. 2 and 3, the bolt 30 is illustrated as being threadably engageable with respect to the structural panel 14 by threaded engagement into a weld nut 32 fixedly secured with respect to the panel 14. A seat belt component, indicated generally at 34 and illustrated as a buckle end, includes a profiled mounting tab 36 having a flat lower surface 38 for abuttingly engaging the complementary flat surface 40 of the body 14. As can best be seen in FIG. 3, full threaded engagement of the bolt 30 with respect to the weld nut 32 effects clamping interengagement between the underside 42 of the head 44 of the bolt 30 and the top surface 46 of the mounting tab 36. This clampingly engages the mounting tab 36 against the vehicle body panel 14. If the underside 42 of the bolt 30 is spaced from the upper surface 46 of the mounting tab 36, movement of the mounting tab 36 with respect to automotive vehicle body may be undesirably permitted.

According to the present invention, this secure engagement of the bolt 30 with respect to the mounting tab 36 is both securely effected and assured. An apparatus, indicated generally at 48, is illustrated as including a drive tool 50, which has a collar 52 from which projects an elongated drive bit 54 for conventional driving engagement with respect to the bolt 30. The drive bit 54 is received in sliding, rotatively free engagement in a cup-like cage member 56, through which the drive bit is guided in effecting driving engagement with the bolt 30.

The cage member 56 is illustrated as including a base portion 58 having a aperture 60 through which the drive bit 54 is slidingly received. It also includes a retainer portion 60 projecting perpendicularly from the base portion 58 and terminating in a free end 62 to abuttingly engage the upper surface 46 of the mounting tab 36.

Most importantly, a pair of spaced electrical contacts are arranged to project perpendicularly from the collar 52 of the drive member 50. The electrical contacts 66, 68 each have free and 70, 72, respectively, which are abuttingly engageable with the upper surface 74 of the cage member base portion 58. The cage member 56, or at least the base portion 58 thereof, is preferably of an electrically conductive material, and the electrical contacts 66, 68 may be utilized to close a circuit through the cage member base portion 58 in switch-like fashion upon the abutting engagement to give an indication that the bolt 30 is seated.

Turning now to FIG. 3, the engaged position is shown, in which the bolt 30 is secured with respect to the mounting tab 36 and the electrical contacts 66, 68 are in an abutting engagement with the base portion 58 of the cage member 56. It will be clear to those skilled in the art that having effected closure of a potential circuit through the engagement shown, any of a number of commonly available indicators of such engagement may be utilized to provide a signal, including oral, visual, or other signals. Any of these can be easily effected by the electrical indication that the bolt 30 is seated with respect to the anchor tab 36.

In some embodiments, it may be advantageous to provide a return spring between the drive tool 50 and the cage member 56 such as that indicated at 76 in FIG. 3. In such configuration, it is advantageous, as shown in FIGS. 2 and 3, to position the electrical contacts 66,68 radially inwardly within the helical compression spring to avoid damage. It will also be appreciated that an axial retainer may be provided between the cage member 56 and the drive set to prevent their separation.

While only certain embodiments of the present invention are shown and described, others may occur to those skilled in the automotive body restraints which do not depart from the scope of the following claims.

We claim:

1. An assembly assurance apparatus for verifying that a threaded fastener is seated against a mounting tab of an automotive seat belt component, the apparatus comprising:

a rotatably driven drive tool having a free end adapted to drivingly engage the fastener for movement toward the mounting tab;

a cup-like cage member having a base portion including an aperture formed therethrough slidably receiving said drive tool and an axially extending retainer portion projecting normally from said base portion and having a free end adapted to abuttingly engage the seat belt component; and a pair of spaced electrical contacts carried for movement with said drive tool toward the seat belt component mounting tab said spaced electrical contacts having free ends positioned with respect to said drive tool free end to engage said base portion of said cage member only when the threaded fastener is seated with respect to the seat belt component mounting tab, thereby electrically interconnecting said contacts to provide an indication that the threaded fastener is so seated.

2. An apparatus as defined in claim 1, wherein said base portion of said cage member is formed of an electrically conductive material.

3. An apparatus as defined in claim 1, further comprising a resilient biasing member mechanically grounded between said drive tool and said cage member.

4. An apparatus as defined in claim 3, wherein said resilient biasing member comprises a helical compression spring.

5. An apparatus as defined in claim 4, wherein said contacts are carried radially internally of said helical compression spring.

6. An apparatus as defined in claim 4, wherein said drive tool includes a stop collar and an elongated drive bit projecting from said stop collar and said drive bit is received in surrounding relationship within said helical compression spring.

7. An apparatus as defined in claim 6, wherein said contacts are carried radially internally of said helical compression spring.

8. An apparatus as defined in claim 7, wherein said spaced electrical contact free ends project axially from said stop collar and the fully compressed height of said helical compression spring is less than the distance between the stop collar and said spaced electrical contact free ends, whereby engagement of said spaced electrical contact free ends with said cage member base portion is permitted.

9. An assembly assurance apparatus for verifying that a threaded fastener is seated against a mounting tab of an automotive seat belt component, the apparatus comprising:

a rotatably driven drive tool having a free end adapted to drivingly engage the fastener for movement toward the mounting tab;

a cup-like cage member having a base portion including an aperture formed therethrough slidably receiving said drive tool and an axially extending retainer portion projecting normally from said base portion and having a free end adapted to abuttingly engage the seat belt component;

a resilient biasing member comprising a helical compression spring mechanically grounded between said drive tool and said cage member; and a pair of spaced electrical contacts carried for movement with said drive tool toward the seat belt component mounting tab, said spaced electrical contacts having free ends positioned with respect to said drive tool free end to engage said base portion of said cage member only when the threaded fastener is seated with respect to the seat belt component mounting tab, thereby electrically interconnecting said contacts to provide an indication that the threaded fastener is so seated.

10. An apparatus as defined in claim 9, wherein said contacts are carried radially internally of said helical compression spring.

11. An apparatus as defined in claim 9, wherein said drive tool includes a stop collar and an elongated drive bit projecting from said stop collar and said drive bit is received in surrounding relationship within said helical compression spring.

12. An apparatus as defined in claim 11, wherein said contacts are carried radially internally of said helical compression spring.

13. An apparatus as defined in claim 12, wherein said spaced electrical contact free ends project axially from said stop collar and the fully compressed height of said helical compression spring is less than the distance between the stop collar and said spaced electrical contact free ends, whereby engagement of said spaced electrical contact free ends with said cage member base portion is permitted.

* * * * *